United States Patent [19]
Cadiou

[11] Patent Number: 5,525,172
[45] Date of Patent: Jun. 11, 1996

[54] COMPOUND ULTRASONIC SONOTRODE ESPECIALLY ADAPTED TO WELDING BETWEEN SEMI-RIGID POLYSTYRENE AND MOLDED CELLULOSE

[76] Inventor: James Cadiou, 134 rue du renard, 76000 Rouen, France

[21] Appl. No.: 490,612

[22] PCT Filed: Feb. 11, 1989

[86] PCT No.: PCT/FR89/00005

§ 371 Date: Sep. 13, 1994

§ 102(e) Date: Sep. 13, 1994

[87] PCT Pub. No.: WO90/08028

PCT Pub. Date: Jul. 26, 1990

[51] Int. Cl.⁶ .................................................. B32B 31/16
[52] U.S. Cl. .................. 156/73.1; 156/290; 156/292; 156/580.2; 264/442
[58] Field of Search ................. 156/73.1, 580.1, 156/580.2, 290, 292; 206/521.1; 264/23; 425/174.2

[56] References Cited

U.S. PATENT DOCUMENTS

| | | | |
|---|---|---|---|
| 3,426,951 | 2/1969 | Pohlman et al. | 156/73.1 |
| 3,510,049 | 5/1970 | Donovan | 206/521.1 |
| 3,577,292 | 5/1971 | Obeda | 156/73.1 |
| 3,666,602 | 5/1972 | Obeda | 156/73.1 |
| 3,780,926 | 12/1973 | Davis | 156/73.1 X |
| 3,948,705 | 4/1976 | Ausnit | 156/73.4 |
| 4,244,762 | 1/1981 | Holson | 156/73.1 |
| 4,529,473 | 7/1985 | Mims | 156/580.2 |
| 4,582,239 | 4/1986 | Scotto | 156/580.2 X |
| 4,767,492 | 8/1988 | Fukusima et al. | 156/580.2 |
| 4,798,639 | 1/1989 | Yamaguchi | 156/73.1 |
| 4,904,319 | 2/1990 | Divincenzo et al. | 156/73.4 |

FOREIGN PATENT DOCUMENTS

| | | |
|---|---|---|
| 0008362 | 5/1982 | European Pat. Off. . |
| 0242480 | 12/1986 | European Pat. Off. . |
| 2084015 | 12/1971 | France . |
| 235046 | 4/1986 | German Dem. Rep. . |

OTHER PUBLICATIONS

Kunststoffe, vol. 56, No. 6, juin 1966, pp. 436–438, "Verbinden und Trennen von Kunststoffen mit Ultraschall" * p. 436, colonne de droite, lignes 21–25*.

Derwent's abstract No. 86–041350/60, SU,A, 1 168 430 (Moiseev) 23 juillet 1985, voir le document en entier.

Th. Herrmann "Gestalten der Schweissnaht beim Ultraschallschweissen", Kunststoffen 77, No. 7 1987, voir le document en entier.

"Patent Abstracts of Japan" abrege du JP 60–201928 (Daiwa Seikan K.K.) 6 janvier 1983, voir le document en entir.

"Patent Abstracts of Japan" abrege du JP 60–201928 (Yoshino Kogyosho K.K.) 12 octobre 1985, voir le document en entier.

Primary Examiner—David A. Simmons
Assistant Examiner—J. Sells
Attorney, Agent, or Firm—Browdy and Neimark

[57] ABSTRACT

A method for ultrasonically welding a transparent semi-rigid lid onto a molded cellulose egg tray employs a compound sonotrode which includes a holding block and a plurality of individual sonotrodes coupled to the holding block. Each of the individual sonotrodes has a respective welding surface gridded by an array of square-base pyramids. The adjoining pyramids have contiguous angled surfaces that form substantially a 90-degree angle therebetween for effectively welding plastic to cellulose. The welding surfaces preferably have an imprint outline that is rectangular or circular.

7 Claims, 1 Drawing Sheet

COMPOUND ULTRASONIC SONOTRODE ESPECIALLY ADAPTED TO WELDING BETWEEN SEMI-RIGID POLYSTYRENE AND MOLDED CELLULOSE

BACKGROUND OF THE INVENTION

This invention pertains to ultrasound welding and concerns improvements made in "compound" sonotrodes in order to perform ultrasonic welding between semi-rigid polystyrene and molded cellulose. This invention applies especially to the closing of cellulose trays holding 20, 24 and 30 eggs under transparent polystyrene lids.

In the egg industry, trays of 20, 24 and 30 eggs under a transparent lid are wrapped in a retractable film.

SUMMARY OF THE INVENTION in order to avoid the use of the film and to innovate in the presentation of the product, we have decided to connect the lid and tray by ultrasonic welding.

The specific nature of the materials to be welded required the development of a sonotrode equipped with specific imprints, which are the object of this application.

The materials to be welded are:
1) Transparent semi-rigid polystyrene, having a thickness of 0.31 to 0.36 mm.
2) Molded cellulose produced using recycled paper, having a thickness of 1.0 to 1.4 mm.

BRIEF DESCRIPTION OF THE DRAWING FIGURES

DETAILED DESCRIPTION OF THE PREFERRED EMBODIMENTS

Figure 1:
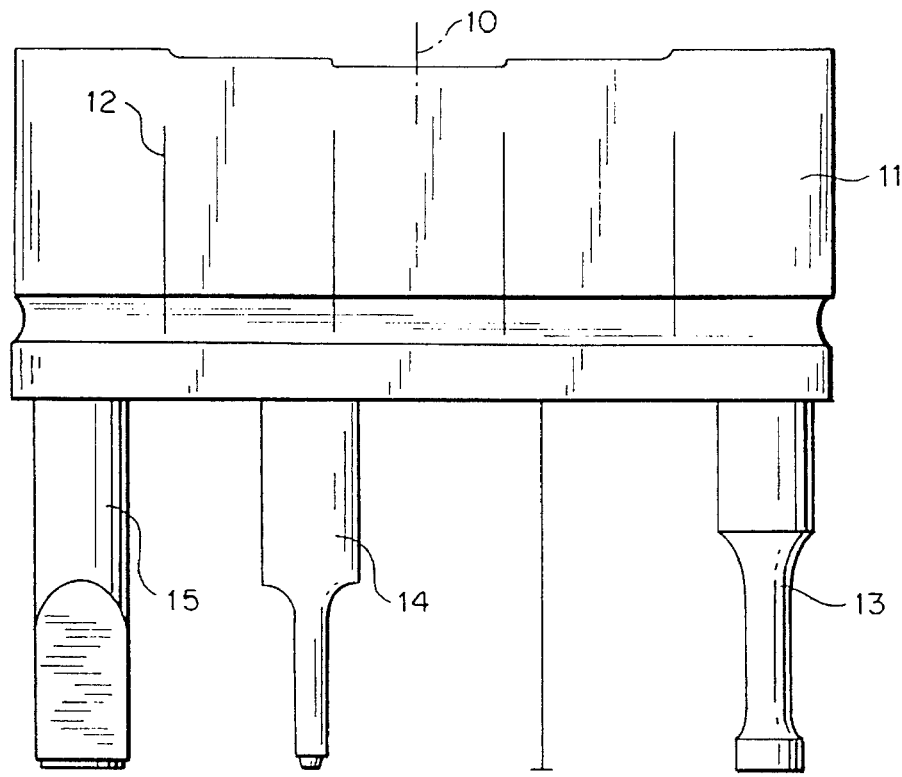
FIG. 1 is an elevational view of the invention.

The compound sonotrodes used (FIG. 1) comprise a holding block (11) pierced respectively with 2 and 4 non-issuing slits (12) for 3- and 4-head sonotrodes. The holding block is equipped with threading (10) for attachment to the vibrating block.

Single sonotrodes (13, 14 and 15) attached to the motor block concentrate energy on their active terminal zone. Their positioning on the holding block depends on the points to be made.

Flat imprints at the end of the sonotrodes do not make it possible to produce a weld resistant to traction exerted in all directions. Indeed, in molded cellulose material composed of layers of cellulose, resistance to traction is maximum for tangential traction and minimum for traction perpendicular to the welded surface.

Based on these findings, we have defined a form of imprint that meets the following objectives:

1) Obtaining better resistance to traction in all directions in space;
2) Modifying the surface of the cellulose at the weld point;
3) Allowing the polystyrene to penetrate the cellulose fibers;
4) Increasing the welded surface with respect to the surface of the point of origin.

Figure 2:
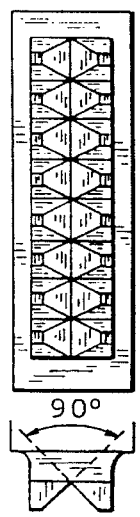
FIG. 2 is a detail, plan view of a sonotrode welding surface.
Figure 3:
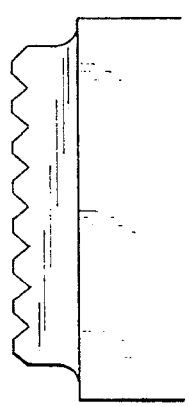
FIGS. 3 and 4 are detail, elevational views of a sonotrode welding surface.
Figure 4:
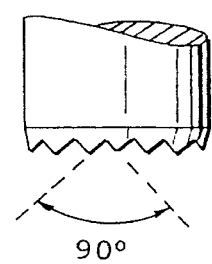
Figure 5:
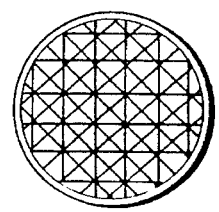
FIG. 5 is a detail, plan view of a sonotrode welding surface.

Two types of single sonotrodes were used in our tests: circular imprint sonotrodes (13) and rectangular and circular imprint sonotrodes. The rectangular imprint sonotrodes are shown in FIGS. 2 and 3, the circular imprint sonotrodes are shown in FIGS. 4 and 5.

The rectangular imprint is composed of 2 rows of the frustum of square-based oblique pyramids having outside surfaces perpendicular to the plane of the imprint. The imprint is characterize by a 90° angle between the surfaces of two contiguous pyramids. The height of the frustums of the oblique pyramids is variable and makes it possible to adapt the strength of a weld point to the use.

The circular imprint is composed of a grid of square-based pyramids having a 90° characteristic angle between the surfaces two contiguous pyramids. As in the preceding case, the pyramids can be truncated to adapt the strength of the weld to the use.

What is claimed is:

1. A method for ultrasonically welding a transparent semi-rigid lid onto a molded cellulose egg tray, the method comprising:
   providing a compound sonotrode including
      a holding block and
      a plurality of individual sonotrodes coupled to the holding block, each of the individual sonotrodes having a respective welding surface gridded by square-base pyramids, adjoining ones of the pyramids having contiguous surfaces forming substantially a 90-degree angle therebetween, the respective welding surface having an imprint outline shape; and
   welding the lid to the tray with ultrasonic vibrations from the individual sonotrodes.

2. The method according to claim 1, wherein the imprint outline shape is circular.

3. The method according to claim 1, wherein the imprint outline shape is rectangular.

4. The method according to claim 1, wherein the pyramids are truncated.

5. The method according to claim 1, wherein the lid includes polystyrene.

6. The method according to claim 4, wherein the lid is 0.31 to 0.36 mm thick.

7. The method according to claim 1, wherein the tray is 1.0 to 1.4 mm thick.

* * * * *